United States Patent [19]

Issachar et al.

[11] Patent Number: 4,876,073

[45] Date of Patent: Oct. 24, 1989

[54] RADIONUCLIDE GENERATOR

[75] Inventors: David Issachar; Jacob Trumper, both of Rehovot; Shmuel Abrashkin, Tel Aviv, all of Israel

[73] Assignee: State of Israel, Prime Minister's Office Israel Atomic Energy Commission, Soreq Nuclear Research Center, Yavne, Israel

[21] Appl. No.: 139,078

[22] Filed: Dec. 18, 1987

Related U.S. Application Data

[63] Continuation of Ser. No. 752,912, Jul. 8, 1985, abandoned.

[30] Foreign Application Priority Data

Jul. 6, 1984 [IL] Israel .......................................... 72321

[51] Int. Cl.⁴ ......................... G21G 4/08; C01G 55/00

[52] U.S. Cl. .................................. 423/2; 250/432 PD; 252/645; 424/1.1; 423/22; 423/249; 423/DIG. 7; 210/682

[58] Field of Search .................... 423/2, 6, 22, 54, 100, 423/DIG. 7, 249; 250/432 PD; 210/682; 252/645; 424/1.1

[56] References Cited

U.S. PATENT DOCUMENTS

| | | | |
|---|---|---|---|
| 4,185,078 | 1/1980 | Quatrini et al. | 423/49 |
| 4,211,753 | 7/1980 | Pemsler et al. | 423/54 |
| 4,414,145 | 11/1983 | Panek | 252/645 |
| 4,683,123 | 7/1987 | Knapp, Jr. et al. | 423/5 |
| 4,729,380 | 3/1988 | Treves et al. | 423/2 X |

FOREIGN PATENT DOCUMENTS

| | | | |
|---|---|---|---|
| 0914004 | 12/1962 | United Kingdom . | |
| 2087633 | 5/1982 | United Kingdom | 250/432 PD |
| 2109619 | 6/1983 | United Kingdom | 423/2 |
| 2149562 | 6/1985 | United Kingdom . | |

OTHER PUBLICATIONS

Kulprathipanja, S. et al., *J. Labelled Compd. Radiopharm.*, 1977, 13(2), p. 268 (Chem. Abs., 87:30737).

Cheng, C. et al., *Appl. Nucl. Radiochem.*, 1982, 73–87 (Chem. Abs., 98:24097).

*Primary Examiner*—John F. Terapane
*Assistant Examiner*—Virginia B. Caress
*Attorney, Agent, or Firm*—Browdy and Neimark

[57] ABSTRACT

There is provided a generator for short-lived radionuclides. The generator comprises a support, an ion-exchange agent and a parent radionuclide in a steady-state equilibrium with a daughter nuclide, which daughter nuclide can be selectively eluted from said column. A suitable parent radionuclide is $^{191}$OS in equilibrium with $^{191m}$Ir. There is also provided a specific Os(VI) complex which has certain advantages.

9 Claims, 1 Drawing Sheet

FLOW CHART
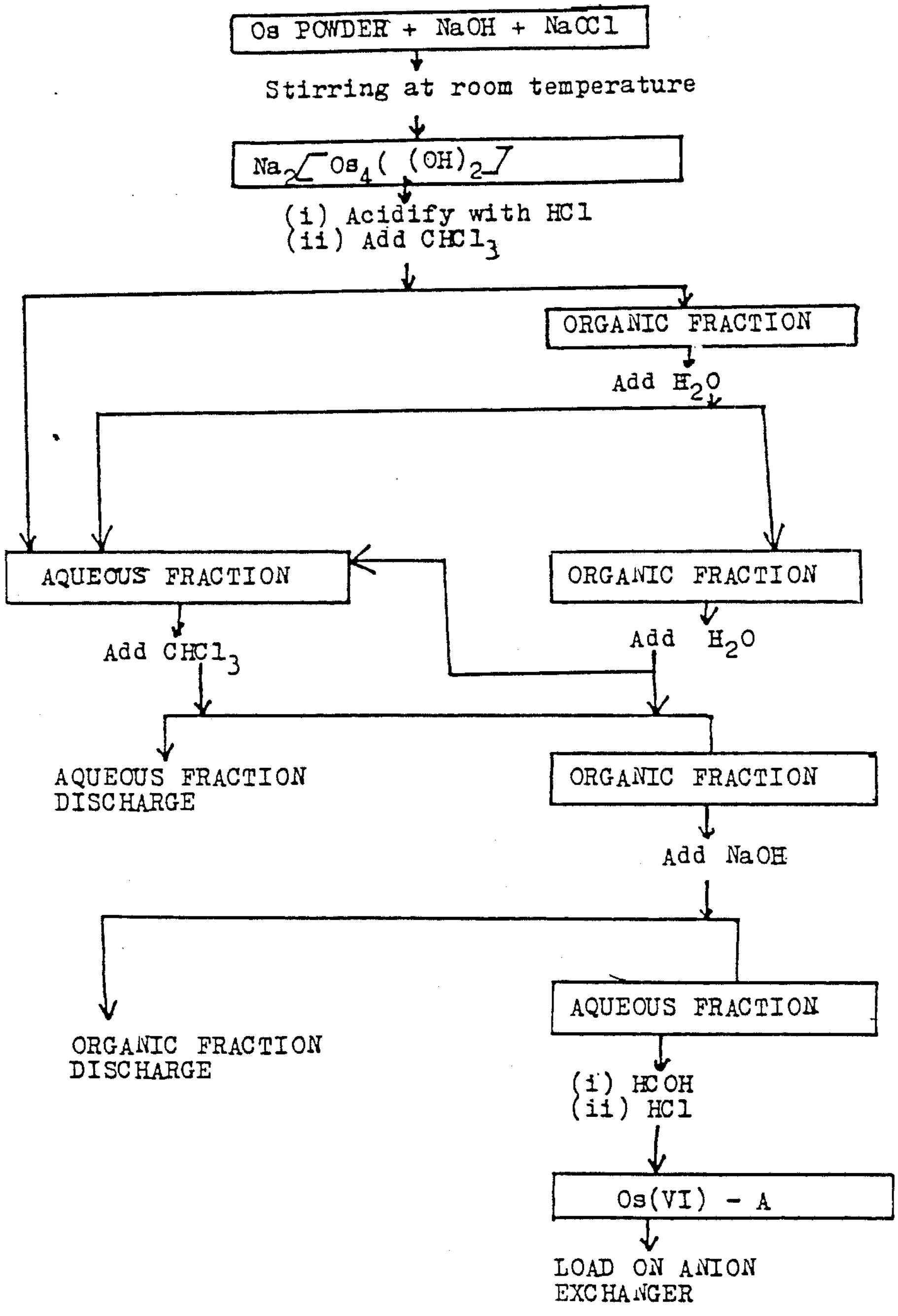

RADIONUCLIDE GENERATOR

This application is a continuation of application Ser. No. 752,912, filed July 8, 1985, now abandoned.

FIELD OF THE INVENTION

There are provided generators for short-lived radionuclides for use in medicine, and especially in diagnostic methods such as angiocardiography. There is also provided a novel process for the production of an osmium complex which is used in one type of such generators. Other objects of the invention and features thereof will become apparent hereinafter.

BACKGROUND OF THE INVENTION

First pass radionuclide angiography following bolus administration has been used principally for the detection and quantitation of intracardiac shunts, evaluation of right and left ventricular ejection fraction, measurement of cardiac output and various other cardiac parameters. This technique has proved its potential for non-invasive evaluation of a variety of congenital and acquired cardiovascular disorders, especially in children. A radionuclide of short half-life must be used, and the one in use to the largest extent at present is technetium-99m, which is used mainly as sodium pertechnetate with a $\gamma$ of 140 keV, with a physical half-life of 6 hours. There have also been proposed generator systems of Cd-109→Ag-109m and Os-191→Ir-191m. In the case of the Cd/Ag generator the half life of 1.26 years of Cd poses a problem should breakthrough occur. There has been developed a rubidium-81 krypton-81m generator with Rb half-life of 4.7 hours and Krypton half-life of 13.1 seconds. Krypton-81m is well suited for long studies but is not suitable for angiocardiography as it is readily eliminated by the lungs.

Another ultra-short lived generator is Ba-137m with a half-life of 2.55 minutes. However, its photon energy of 662 keV is too high for use with gamm cameras of the Anger type. Yet another generator is the Hg-195→A-195m generator, the daughter having a 30.5 seconds half-life, with the parent having a 40 hour half-life.

SUMMARY OF THE INVENTION

There is provided a generator for the production of ultra-short lived radionuclides for use in medical diagnostics, and especially for use in angiocardiography in adults and in children.

(1) The novel type of radionuclide generator is based on the concept of providing an inorganic support column to which there is applied a suitable ion exchange agent adapted to firmly bind a suitable compound or complex of the parent radioactive element, there being established a steady state between said parent compound and the daughter nuclide of short life time which results from said parent nuclide.

The invention is mainly illustrated with reference to a preferred embodiment which is based on $^{191}$Os giving $^{191m}$Ir. As pointed out in the following, other generators can be provided based on systems like $^{178}$W $^{178}$Ta, or $^{195m}$Hg $^{195m}$Au, and the like.

The following description describes in detail the embodiment of the generator based on Os/Ir.

Thus, the preferred embodiment of a generator for short-lived radionuclides according to the present invention, is based on the use of a column charged with $^{191}$Os which has a half-life of 15.5 days, giving $^{191m}$Ir which has a half-life of 4.9 seconds, giving a gamma of 129 keV and X-rays of 65 keV, used advantageously in conjunction with a scavenger minimizing the breakthrough of Os to very low values. There is also provided a novel process for the production of an osmium complex which is used for charging the column, which process is comparatively simple, gives a pure product in a high yield, and which complex has advantageous properties for the intended purposes.

A BRIEF DESCRIPTION OF THE DRAWING

In the attached drawing, a flowsheet of a preferred embodiment of the process for the production of the osmium complex used in the radionuclide generator of the invention is illustrated.

The process comprises reacting osmium metal, generally in powder form, with sodium hydroxide and sodium hypochlorite to form a complex of the formula $Na_2[OsO_4(OH)_2]$, which is acidified and $OsO_4$ is extracted by means of a suitable solvent, such as chloroform or carbon tetrachloride, converted by means of sodium hydroxide to a complex as defined above, reduced with formaldehyde to give $Na_2[OsO_2(OH)_4]$ which is reacted with hydrochloric acid to give the desired complex, designated herein as Os(VI)-A, which is believed to consist mainly of $Na_2[OsO_2Cl_4]$, possibly in combination with lesser quantities of $Na_2[OsO_2(OH)_2Cl_2]$. The hydrophobic solvent serves to separate the osmium compound from salts and oxidants which may interfere in the next steps of the preparation. Formaldehyde is preferred as reduction agent as it makes it possible to reintroduce the osmium compounds fully in the aqueous phase.

The process is characterized by a high overall yield of the complex calculated on the osmium metal starting material: the yield is better than 90 per cent. The process is a simple and speedy one and only about one hour is required for the initial dissolution of the osmium metal powder; the other stages which are simple reactions with solvent extraction steps, being rapid and convenient ones, the overall time required for the formation of the OS(VI)-A complex being about 15–20 minutes, starting with the dissolved osmium. The thus obtained complex is sorbed on a suitable carrier in a column. Good results have been obtained with a system designated as SG-336 which is Aliquot 336, a quaternary ammonium salt having the formula $(R_3N^+CH_3)Cl^-$ where $R = C_8 - C_{10}$ (methyl tricaprylyl ammonium chloride) sorbed on silica gel.

The recovery of the iridium is about 50 per cent when elution is effected with saline at a suitable pH, such as about pH 1, the breakthrough of osmium being very low (of the order of 0.05%), when no scavenger is used. It is advantageous to provide a further column with an Os-scavenger, such as 2,3-dihydroxy-benzoic acid, 3,4,5-trihydroxy benzoic acid or the like, and when this is used the Ir recovery is about 35% with a breakthrough as low as about 0.0025% of osmium.

It has been found that the system Aliquot 336/silica gel is highly advantageous, and degradation of the carrier by the radioactive material is negligible.

The thus produced generator is avantageously stored until use at a low temperature (about 0°–4° C) and under such storage conditions highly active generators did not deteriorate during about 14 days. Instead of the anion exchanger chosen, other anion exchangers can be used although the chosen one seemed to give especially advantageous results. An important feature is the use of an organic anion exchange agent supported by a suitable inorganic support. Various ratios of Aliquot 336 on silica gel were tried, and satisfactory results were obtained with from 10 to 35% w/w of Aliquot 336 on silica gel.

Generally about 1 ml of silica gel is charged with about 8 mg Os calculated as metal or about 16 mg calculated as the complex; this contains a certain fraction of radioactive isotope (about $10^{-6}$), the overall quantity of radioactive Os being about 500800 mCi, although charges of up to about 1000 mCi per gram can be provided.

The silica gel used is advantageously of small size, of the order of 30–40μ particles.

In the charged column there exists a steady state between $^{191}Os$ and $^{191m}Ir$ which has a half-life of 4.9 seconds. When to be used, the column is eluted with a pH 1 solution, generally acidified saline and a quantity of from 1 to about 1.5 ml of such solution is admixed with about 7 to 8 ml of buffered saline and injected into the patient at a final pH of about 3.5 intravenously. For radioangiography, the quantity eluted varies between 20 to 100 mCi according to the patient. As the recovery of Ir is of the order of 35%, and as the Os breakthrough is of the order of $2\times10^{-3}\%$, only very low quantities of $^{191}Os$ are administered, and the procedure can be repeated without an undue exposure of the patient to radiation and without establishing a hindering background radiation.

The column charged with the Os complex is advantageously followed with a scavenging column of a substance known to be an effective complexing agent for osmium. The columns used were prepared by soaking the SG-336 material in an aqueous solution of a substance such as 2,3-dihydroxy-benzoic acid catechol or 3,4,5-trihydroxy benzoic acid. The use of such scavengers considerably improves the ratio of Ir/Os.

Preliminary tests with laboratory animals have confirmed the utility and usefulness of the novel generator for use as source of radionuclides for radioangiography.

Similar tests for the production of short-lived nuclides can be provided based on other radioactive elements.

Thus, for example, the following can be used:

$$\underset{(21.7\text{ days})}{^{178}W} \rightarrow \underset{9.3\text{ min.}}{^{178}Ta} \qquad \text{I.}$$

which gives X-rays of 55 and 65 KeV.

The active compound is advantageously applied in the form of tungstic acid on a column supporting an anionic exchange agent. Biorad AG 1×8 can be used, the elution being with 0.15 n HCl +0.01% $H_2O_2$.

$$\underset{(41.6\text{ hours})}{^{195m}Hg} \rightarrow \underset{(30.5'')}{^{195m}Au} \qquad \text{II.}$$

which gives X-rays of 262 KeV.

The active material is advantageously applied in the form of mercury nitrate $Hg(NO_3)_2$, on zinc sulfide supported by a silica column. The elution is with sodium thiosulfate.

The following Example is to be construed in a non-limitative manner.

EXAMPLE a. To 10 ml of sodium hypochlorite solution (composed of 500 mg NaOH dissolved in 5% aqueous solution of NaOCl), 100 mg of radioactive Osmium powder (5 Ci) is added (about 100 mesh).

b. The mixture is stirred (by magnetic stirrer, for example) at room temperature, for about 2 hours to get a clear red colored solution (stock solution).

c. To 0.6 ml of the osmium stock solution (300 mCi) a few drops of 4N HCl are added, that bring the solution to an acidic pH.

d. The Osmium compound is then extracted from the aqueous solution by adding 1 ml of chloroform ($CHCl_3$). At this stage more than 90% of the osmium compound is moved from the aqueous to the organic phase. To the separated aqueous phase, another 1 ml of fresh chloroform is added to extract the rest of the osmium compound from the aqueous phase. The aqueous fractions are then discarded while the organic fractions are combined.

e. The combined organic phase is washed with 2 ml of double distilled water. The aqueous phase is then discarded while the organic phase is kept for the next stage.

f. To the organic phase (in which the osmium compound is dissolved) 1 ml of 4N NaOH is added and well mixed.

At this stage, the aqueous fraction (at the top of the test tube) is clear, red-colored, while the organic phase (at the bottom of the test tube) is clear and not-colored.

The aqueous fraction is then collected while the organic fraction is discarded.

g. To the clear red-colored aqueous solution, 1 ml of 30% formaldehyde solution is added to get immediately a clear purplecolored solution. To this solution, 0.5 ml of concentrated hydrochloric acid is then added to get a clear caramel-colored solution (Os(VI)-A), the activity of which is 280 mCi.

h. The Os(VI)-A is then loaded on SG-336(10%) 4×55 mm column and then washed with 10 ml of saline pH 1, removing impurities and also some iridium. The thus obtained column is ready for use.

Os — 191 → Ir — $191_m$ Generators
Performance

| | No Scav. | With Scav. |
|---|---|---|
| Ir recovery (%) | 50 | 35 |
| Os Breakthrough (%) | $8\cdot10^{-2}$ | $2\cdot10^{-3}$ |
| ε = Enrichment factor | 630 | 17.500 |
| Shelf-Life | = 4 weeks | |

In another experiment the Os(VI)-A complex was applied to silica gel impregnated with 10% (weight by weight) of methyltridodecylammonium chloride (designated by us as SGMTDAC), the particle size of the silica being in the range of 30 to 60 microns.

The results obtained were as follows:

Ir recovery: without scavenger - 60%: with scavenger - 35%; Os breakthrough: without scavenger $10^{-2}\%$, with scavenger: $4.10^{-4}\%$, the enrichment factor being: without scavenger about 6000; with scavenger - about 88,000. The shelf life was also about 4 weeks. The extremely low breakthrough is of paramount importance.

Instead of the above quaternary ammonium compound, others having at least two alkyl groups with at least 8 carbon atoms, and preferably 10 carbon atoms; or such compounds with at least one phenyl group and at least one alkyl of at least 8 carbons, can be used to obtain similar results. The quaternary ammonium ion exchange agent may thus have the formula $(R_3N^+CH_3)Cl^-$ wherein the R groups are $C_8$–$C_{12}$ alkyl, or at least one of the R groups is phenyl and the remaining groups are $C_8$–$C_{10}$ alkyl.

We claim:

1. A generator of short-lived radionuclides, comprising a column containing a silica gel support impregnated with a long chain quaternary ammonium ion exchange agent having the formula $(R_3N^+CH_3)Cl^-$ wherein the R group is $C_8$–$C_{12}$ alkyl or at least one of the R groups is phenyl and the remaining groups are $C_8$–$C_{10}$ alkyl, a complex of a parent radionuclide $^{191}Os$ being sorbed on said support in an amount sufficient to maintain the parent radionuclide in steady state equilibrium with its short-lived daughter radionuclide $^{191m}Ir$, said complex having been produced by:

dissolving radioactive osmium metal in a hypochlorite/hydroxide solution;

acidifying the mixture;

extracting $OsO_4$ with an organic solvent;

washing the organic phase;

adding an aqueous base to complex and extract the osmium from the organic phase;

adding a reducing agent and acidifying the mixture to form an osmium complex selected from the group consisting of $Na_2(OsO_2Cl_4)$ and $Na_2(OsO_2(OH)_2Cl_2)$;

the daughter radionuclides being selectively eluted from the column by elution with physiological saline having a pH of about 1.

2. The short-lived radionuclide generator of claim 1, wherein the osmium is sorbed on the silica gel in an amount of from about 4 to 15 milligrams per gram of silica gel.

3. The short-lived radionuclide generator of claim 1, wherein the quaternary ammonium compound is methyl tricaprylyl ammonium chloride.

4. The short-lived radionuclide generator of claim 1, comprising a further column containing an osmium scavenger selected from the group consisting of 2,3-hydroxy-benzoic acid and 3,4,5-trihydroxy benzoic acid.

5. A process for the preparation of a radionuclide generator, which comprises the steps of:

dissolving radioactive osmium metal in a hypochlorite/hydroxide solution;

acidifying the mixture;

extracting $OsO_4$ with an organic solvent;

washing the organic phase;

adding an aqueous base to complex and extract the osmium from the organic phase;

adding a reducing agent and acidifying the mixture to form an osmium complex selected from the group consisting of $Na_2(OsO_2Cl_4)$ and $Na_2(OSO_2(OH)_2Cl_2)$;

applying said complex to a finely divided silica gel carrier having a quaternary ammonium salt anionic ion exchange agent having the formula $(R_3N^+CH_3)Cl^-$, wherein R is $C_8$–$C_{12}$ alkyl or at least one of the R groups is phenyl and the remaining groups are $C_8$–$C_{10}$ alkyl, sorbed thereon.

6. The process of claim 5, wherein the quaternary ammonium salt is methyl tricaprylyl ammonium chloride.

7. The process of claim 5, wherein the organic solvent is chloroform or carbon tetrachloride, the reducing agent is formaldehyde and the osmium is sorbed on the silica gel in an amount of from about 5 to 15 milligrams per gram of the silica gel.

8. A process for obtaining a solution of $^{191m}Ir$ suitable for injection into a human, which comprises eluting the column of claim 1 with an aqueous solution having a low pH, and admixing same with saline.

9. A process for obtaining an injectable solution of $^{191m}Ir$, which comprises eluting the column of claim 8 with an aqueous solution having a pH of 1, and admixing same with saline to produce an intravenously administrable solution having a pH of about 3.5.

* * * * *